J. FREUD.
FOCUSING DEVICE.
APPLICATION FILED APR. 15, 1914.
1,121,178.
Patented Dec. 15, 1914.
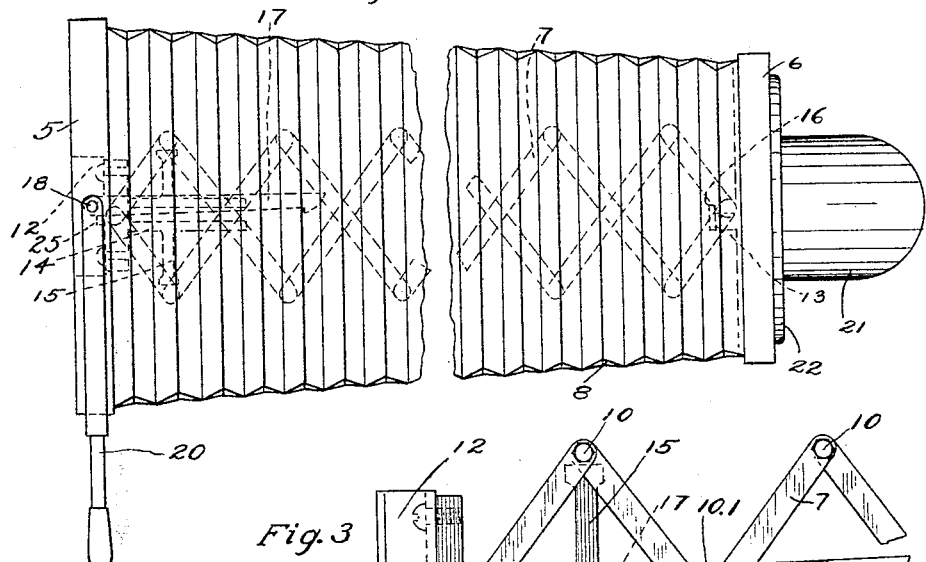
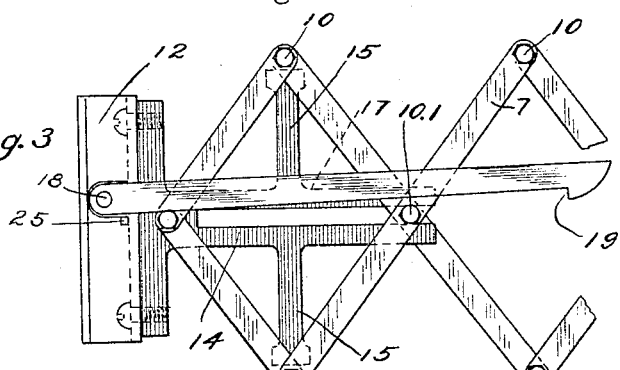
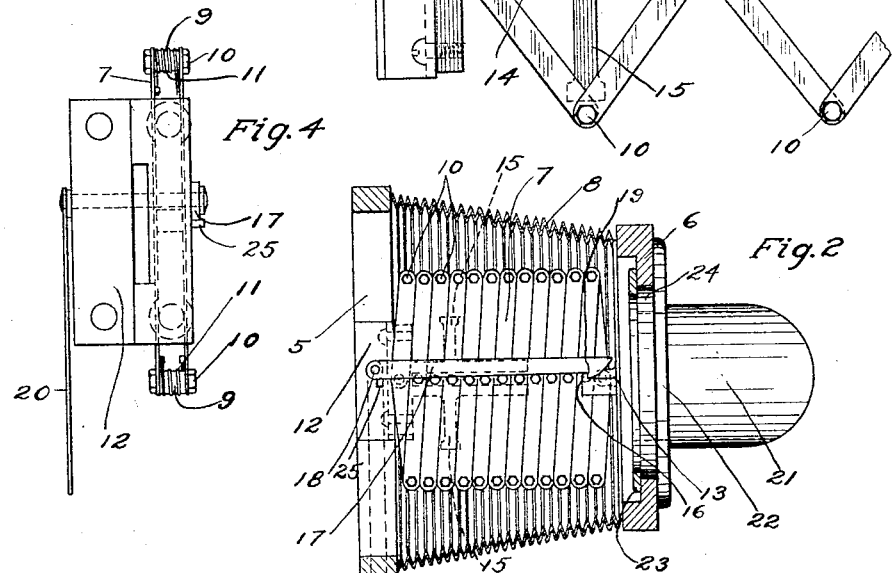
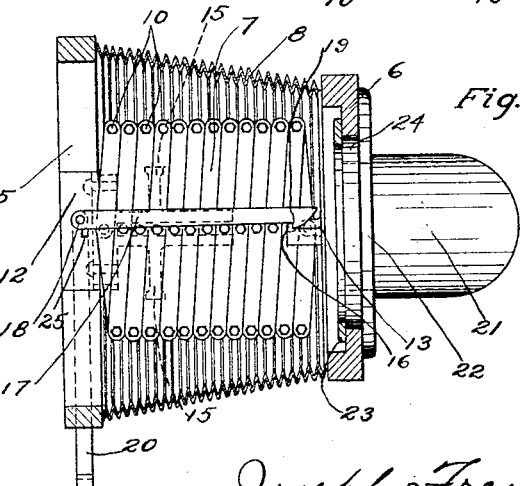
Witnesses:
Walter F. Stone.
Robert S. Martin
Inventor,
Joseph Freud,
By Rummler & Rummler
Attys.

UNITED STATES PATENT OFFICE.

JOSEPH FREUD, OF CHICAGO, ILLINOIS.

FOCUSING DEVICE.

1,121,178.   Specification of Letters Patent.   Patented Dec. 15, 1914.

Application filed April 15, 1914. Serial No. 832,025.

*To all whom it may concern:*

Be it known that I, JOSEPH FREUD, a citizen of the United States of America, and a resident of Chicago, county of Cook, and State of Illinois, have invented certain new and useful Improvements in Focusing Devices, of which the following is a specification.

The main objects of this invention are to provide an improved form of focusing bellows adapted for attachment to large cameras and to be used for locating or focusing images on the ground glass of the camera; to provide an improved construction and arrangement of lazy-tong mechanism for supporting and extending the bellows and adapted to permit a sidewise shifting thereof; to provide improved means for supporting said lazy-tong mechanism and limiting the extension thereof; and to provide improved means for locking the bellows in its collapsed position.

An illustrative embodiment of this invention is shown in the accompanying drawings, in which:

Figure 1 is a side elevation of a focusing device embodying the foregoing improvements, the device being shown in its extended position. Fig. 2 is a sectional view of the same showing the device collapsed. Fig. 3 is an enlarged detail showing the manner in which the lazy-tongs are supported. Fig. 4 is an end view of the same taken from the right of Fig. 3.

In the construction shown in the drawings, the frame members 5 and 6 are connected together by a pair of lazy-tongs 7, in such manner that the members 5 and 6 may be moved toward and away from each other for the purpose of extending the hood 8, which is connected to the frame members 5 and 6, around the edges thereof. The lazy-tongs 7 are formed in the usual manner from a plurality of links and preferably made of thin spring steel so that the frame members 5 and 6 may be shifted sidewise relative to each other when the lazy-tongs are extended for the purpose of allowing the operator to change the angle of vision when focusing the image on the ground glass of the camera. The links are spaced apart axially with respect to the pivotal connections of the links by having collars 9 interposed between the links and embracing the pivot pins 10. Springs 11 embrace the collars 9 located at the ends of the links and normally urge the lazy-tongs into their extended positions.

The lazy-tongs have the end links thereof connected at their intersections to fittings 12 on the frame 5 and fittings 13 on the frame 6 respectively, and are maintained horizontal during their movements by means of tracks or forks 14 rigidly secured to the fittings 12 and engaging the pivot pins 10.1 connecting the intersecting links to which are pivoted the end links attached to the fittings 12. The extension of the lazy-tongs is limited by transversely disposed shoulders 15 integrally secured on the forks 14 and positioned so as to engage the pivot pins 10 connecting the ends of the first two pairs of links next to the fittings 12. The shoulders 15 are of such a length that they will prevent the disengagement of the pivot pins 10.1 and the forks 14.

Locking mechanism is provided for securing the lazy-tongs in their collapsed positions, which in the construction shown in the drawings comprises shoulders 16 secured to the frame 6 and located inwardly of the lazy-tongs, and arms 17 also located inwardly of the lazy-tongs and secured to the pivot pins 18 journaled in the fittings 12. The arms 17 are normally urged by gravity to cause the shoulders 19 formed thereon to engage the shoulders 16. A Y-shaped lever 20 has the parallel arms thereof connected to the pivot pins 18 and is adapted to be swung so as to elevate the arms 17 for simultaneously releasing the shoulders 19 and 16. Shoulders 25 on the fittings 12 support the arms 17 in position to engage the shoulders 16.

A head-piece 21, against which the operator may rest his head when sighting, is secured to a disk 22 which is swiveled on the frame 6. The swiveled connection of the disk 22 is obtained by a ring 23 secured to an annular transverse flange 24 formed on the disk 22, and extending through the opening in the frame member 6.

The device is adapted to be attached to a camera by having the frame 5 suitably secured to that part of the camera which supports the ground glass. In large portrait cameras the ground glass is carried in a frame which is slidably mounted on the camera, so that the ground glass may be moved to one side and the plate simultaneously shifted into the position which the ground glass occupied.

When it is desired to use the device herein shown, the lever 20 is pulled outwardly so as to elevate the arms 17 and disengage the shoulders 19 from the shoulders 16. The springs 9 thereby cause the lazy-tongs to shift the frame outwardly and extend the hood 8. The operator then places his head against the head-piece 21 and sights through the opening to observe the image reflected on the ground glass. During the sighting the lens is shifted so as to bring out the image clearly on the ground glass. In examining this image and focusing the camera the operator may move closer to the ground glass by merely pushing inward on the frame 6, and the hood automatically follows the movement of the operator's head toward or away from the camera. He may also shift the frame 6 to one side so as to change the angle of vision, the sidewise shifting being permitted by reason of the resiliency of the lazy-tong links. The operator may also tilt the head causing the disk 22 to revolve on the frame 6. After the focusing has been completed, the frame 6 is pushed inwardly its full distance, whereupon the shoulders 19 reëngage the shoulders 16 and the device becomes locked in its collapsed position. The device is then shifted away from the camera and the plate set in place.

Although but one specific embodiment of this invention has been herein shown and described, it will be understood that numerous details of the construction shown may be altered or omitted without departing from the spirit of this invention as defined by the following claims.

I claim—

1. In a device of the class described, the combination of a pair of frame members, lazy-tongs secured at the intersection of the end links thereof to said frame members whereby said members are movable toward and away from each other, and means carried by one of said members and slidably supporting certain of the pivot pins connecting other links of said lazy-tongs at their intersections.

2. In a device of the class described, the combination of a pair of frame members, a pair of lazy-tongs secured at the intersection of the end links thereof to said frame members whereby said members are movable toward and away from each other, and tracks carried by one of said members adjacent to each of said lazy-tongs and slidably supporting the respective pivot pins at the intersection of the links which connect with the end links attached to said one frame member.

3. In a device of the class described, the combination of a pair of frame members, a pair of lazy-tongs secured at the intersection of the end links thereof to said frame members whereby said members are movable toward and away from each other, and means carried by one of said members and slidably supporting the pivot pins at the intersection of the links which connect with said end links, the links of said lazy-tongs being formed of resilient material whereby said frames are adapted to be shifted sidewise relative to each other when said lazy-tongs are extended.

4. In a device of the class described, the combination of a pair of frame members, lazy-tongs secured at the ends thereof to said frame members, the links of said lazy-tongs being spaced apart axially of the pivotal connections thereof by means of collars on the pivot pins, and springs embracing the pivot pins connecting the lazy-tong links at their ends and adapted to normally urge said lazy-tongs to shift said members apart.

5. In a device of the class described, the combination of a pair of frame members, lazy-tongs secured at the ends thereof to said frame members, the links of said lazy-tongs being spaced apart axially of the pivotal connections thereof by means of collars on the pivot pins, springs embracing the pivot pins connecting the lazy-tong links at their ends and adapted to normally urge said lazy-tongs to shift said members apart, and coacting shoulders on said frames adapted to have interlocking engagement for holding said lazy-tongs collapsed.

6. In a device of the class described, the combination of a pair of frame members, lazy-tongs secured at the ends thereof to said frame members, the links of said lazy-tongs being spaced apart axially of the pivotal connections thereof by means of collars on the pivot pins, springs embracing the pivot pins connecting the lazy-tong links at their ends and adapted to normally urge said lazy-tongs to shift said members apart, and shoulders on one of said members positioned so as to engage certain of the pivot pins of said lazy-tongs and limit the extension of said lazy-tongs.

7. In a device of the class described, the combination of a pair of frame members, a pair of lazy-tongs secured at the intersection of the end links thereof to said frame members, whereby said members are movable toward and away from each other, and forks carried on one of said members adjacent to each of said lazy-tongs and embracing the pivot pins at the intersection of the links which connect with the end links attached to said one member.

8. In a device of the class described, the combination of a pair of frame members, a pair of lazy-tongs secured at the intersection of the end links thereof to said frame members, whereby said members are movable toward and away from each other, forks carried on one of said members adjacent to each of said lazy-tongs and embracing the pivot pins at the intersection of the links which connect with the end links attached to said one member, and a shoulder on said fork positioned so as to engage one of said pivot pins connecting the ends of the lazy-tong links for limiting the extension of said lazy-tongs.

9. In a device of the class described, the combination of a pair of frames, an extensible hood connecting said frames, lazy-tongs located within said hood and connected at their ends to said frames whereby said frames are movable toward and away from each other, resilient means normally urging said lazy-tongs to shift said frames apart, shoulders on one of said frames, and arms carried by the other frame and normally urged to engage said shoulders for holding said lazy-tongs collapsed.

Signed at Chicago this 13th day of April 1914.

JOSEPH FREUD.

Witnesses:
 EDWIN PHELPS,
 M. IRENE HUTCHINGS.

Copies of this patent may be obtained for five cents each, by addressing the "Commissioner of Patents Washington, D. C."